(12) United States Patent
Smith, II

(10) Patent No.: US 6,708,892 B2
(45) Date of Patent: Mar. 23, 2004

(54) VOICE ANNOTATIONS FOR SMART CARDS

(75) Inventor: Donald X. Smith, II, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 102 days.

(21) Appl. No.: 10/043,034

(22) Filed: Jan. 8, 2002

(65) Prior Publication Data

US 2003/0127524 A1 Jul. 10, 2003

(51) Int. Cl.$^7$ ................................................ G06K 19/06
(52) U.S. Cl. ........................................ 235/492; 235/380
(58) Field of Search ................................ 235/492, 380, 235/382.1, 382.5, 379, 375, 486, 487, 383

(56) References Cited

U.S. PATENT DOCUMENTS

| | | | | |
|---|---|---|---|---|
| 5,859,419 A | * | 1/1999 | Wynn | 235/487 |
| 5,914,472 A | * | 6/1999 | Foladare et al. | 235/380 |
| 5,923,734 A | * | 7/1999 | Taskett | 379/114.18 |
| 5,991,411 A | * | 11/1999 | Kaufman et al. | 705/67 |
| 6,091,835 A | * | 7/2000 | Smithies et al. | 382/115 |
| 6,094,279 A | | 7/2000 | Soscia | |
| 6,325,285 B1 | * | 12/2001 | Baratelli | 235/380 |
| 6,382,516 B1 | * | 5/2002 | King | 235/492 |
| RE39,137 | * | 6/2003 | Wynn | 235/487 |

FOREIGN PATENT DOCUMENTS

| | | |
|---|---|---|
| DE | 19609732 A1 | 9/1997 |
| FR | 2712714 | 5/1995 |

OTHER PUBLICATIONS

3D Smart Cards & Loyalty Cards from Splenticular.com 3D Smart Card Example; from www.splenticular.com; Sep. 11, 2001; pp. 1–4.
TSA Solution Detail; Electronic Commerce and POS Solutions from www.acismartcard.com; Sep. 11, 2001, pp. 1–3.
PACEinegration Smart Card 101 from www.smartcardesolutions.com; Sep. 11, 2001; pp. 1–8.
Smart Card International from www.smartcardintl.com; Sep. 11, 2001; pp. 1–2.

* cited by examiner

Primary Examiner—Thien M. Le

(57) ABSTRACT

The smart card, with a built-in microphone, is used to perform a transaction. The consumer may then record a voice annotation that is associated with the transactional data. The voice annotation is stored with the respective transactional data in the smart card memory. The voice annotation can later be played back or printed out with the respective transactional data.

12 Claims, 5 Drawing Sheets

VOICE ANNOTATIONS FOR SMART CARDS

FIELD OF THE INVENTION

The present invention relates generally to smart cards. Particularly, the present invention relates to voice annotation and storage in smart cards.

DESCRIPTION OF THE RELATED ART

A larger percentage of consumer spending is accomplished with credit cards and debit cards. Credit and debit cards offer the convenience of receiving a single statement every month no matter how many transactions were performed.

Smart credit/debit cards have been gaining popularity lately. These cards provide the convenience of a normal credit/debit card but with a higher level of security for both the bank and the consumer. The card cannot be used if a password is not entered properly. Additionally, since the card can store and track account balances, the consumer must recharge the card in order to continue using it.

A typical smart credit/debit card is comprised of a microprocessor and memory. Connectors on the exterior of the card couple the smart card circuitry to a merchant's card reader. Through the connectors, the card reader can read the contents of the memory in order to verify the consumer's identity and/or debit the account balance.

Whenever a credit/debit card or a smart card is used, the bank records the merchant, date of purchase, and the amount of purchase for later use by the consumer. The consumer may then use this data in a personal finance management program (e.g., Quicken, MS Money) to track his spending.

One problem with credit/debit card transactions is that the bank does not record the actual item purchased. Since the bank's statement may take up to a month to arrive, the consumer may have forgotten what was purchased from a particular merchant or why the purchase was made. There is a resulting need for a consistent and easy method of recording the content of purchases or other transactions involving a smart card.

SUMMARY OF THE INVENTION

The present invention encompasses a smart card that has the capability to store a voice annotation along with a transaction, such as a financial transaction. Before or after a consumer performs a transaction with the smart card, the consumer uses a microphone to produce a voice annotation signal. The voice annotation signal, in the preferred embodiment, is related to the transaction data (e.g., price, date, account balance) generated from the transaction.

The smart card has memory that stores the voice annotation signal with its respective transaction data. The voice annotation signal may be stored consecutive with the transaction data or in another location in memory with an address pointer to the linked transaction data.

A controller or processor is coupled to the microphone and the memory. The controller controls the smart card operations. The operations include user authorization, storage of the voice annotation signal, and storage of the respective transaction data.

An input/output (I/O) connector, coupled to the controller, provides the controller with the transaction data. The I/O connector couples the smart card to a merchant's card reader or to the consumer's card reader coupled to a printer and/or computer.

DETAILED DESCRIPTION OF THE PREFERRED EMBODIMENT

The smart card of the present invention provides a consumer with the ability to annotate each transaction for which the card is used. Since the card is usually in the consumer's hand just before or just after a transaction, the simplest and most natural place to record information about the transaction is on the card itself. By providing a microphone and memory for storing the consumer's voice, the consumer can record, for later playback or download, a note for each transaction.

Figure 1:
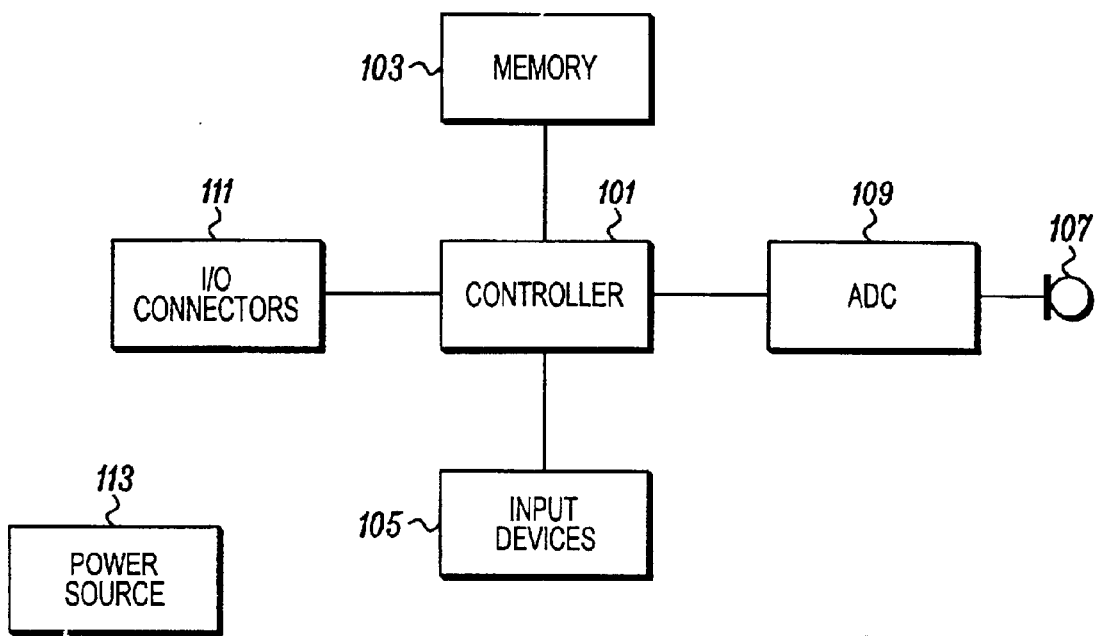
FIG. 1 shows a block diagram of a smart card of the present invention.

FIG. 1 illustrates a block diagram of the smart card of the present invention. This card is comprised of a controller (101) that controls the operation of the smart card. The controller (101), in one embodiment, is a microprocessor such as a MOTOROLA POWERPC or an INTEL PENTIUM processor. The controller (101), in other embodiments, is a microcontroller or microcontroller circuitry.

Memory (103) is coupled to the controller (101) for storage of data entered into the smart card, as discussed subsequently. The memory (103), in the preferred embodiment, is Flash memory that stores and retains data without using additional power. Alternate embodiments use other forms of memory such as random access memory (RAM), read only memory (ROM), and non-volatile RAM (NVRAM).

The memory (103) block of FIG. 1 may also represent multiple forms of memory. For example, the memory block (103) can also indicate both Flash memory and ROM. In such an embodiment, the ROM contains the operating instructions required by the controller (101) to control the smart card.

A microphone (107) is used to enter the voice annotations for each transaction for which the smart card is used. The microphone (107) is a typical sound transducer that may be a membrane-type microphone to fit on the smart card.

The microphone (107) is coupled to an analog-to-digital converter (ADC) (109). The ADC (109) is responsible for sampling the analog voice signal from the microphone (107) in order to convert the voice signal to a digitized representation of the voice signal. The digital voice signal is then input to the controller (101) for processing by the processes of the present invention.

In one embodiment, the ADC (109) is a separate circuit. In another embodiment, the ADC (109) function is included into the controller (101) block functionality.

The block for input devices (105) can include any type of switch, button, or any other input device. In the preferred embodiment, the input devices (105) are in the form of membrane switches that are used to control the operation of the smart card. For example, one switch may be a record switch, a second switch may be a play switch, and a third switch may be a stop switch. Alternate embodiments have other quantities of switches with different switch functions.

Input/output (I/O) connectors (111) are coupled to the controller (101). The connectors (111) enable the smart card to be coupled to a card reader, external power source, printer, or computer. The connectors (111) allow access to the functions and the memory of the smart card.

A power source (113) is coupled to the circuitry of the smart card in order to power the functions of the card. The power source (113) may be a small battery, one or more solar cells, or a combination of batteries and solar power.

In an alternate embodiment, the smart card may optionally be comprised of a speaker (not shown). The speaker would allow the consumer to play back the voice annotations. If, in one embodiment, the card also has a display as well as a speaker, the transaction data could be displayed at the same time that the voice annotation is played back.

Figure 2:
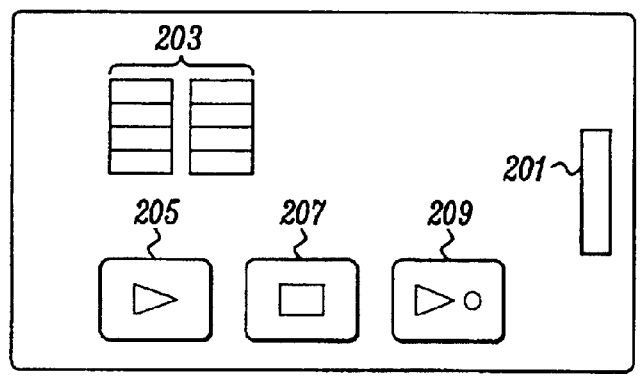
FIG. 2 shows a typical smart card of the present invention.

FIG. 2 illustrates a typical layout for a smart card (200). The input membrane switches (205, 207, and 209) are along the bottom of the card (200) to facilitate access for one-handed use. In the present embodiment, the switches include a play switch (205), a stop switch (207), and a record switch (209). Alternate embodiments place the switches in different locations on the card (200).

The microphone (201) is located along one side of the smart card (200) in the present embodiment. Alternate embodiments place the microphone (201) in other locations on the card.

The I/O connectors (203) are located in the upper left corner of the smart card (200). This is the standardized location in the smart card industry. However, alternate embodiments place the I/O connectors (203) in other locations on the card (200).

Figure 3:
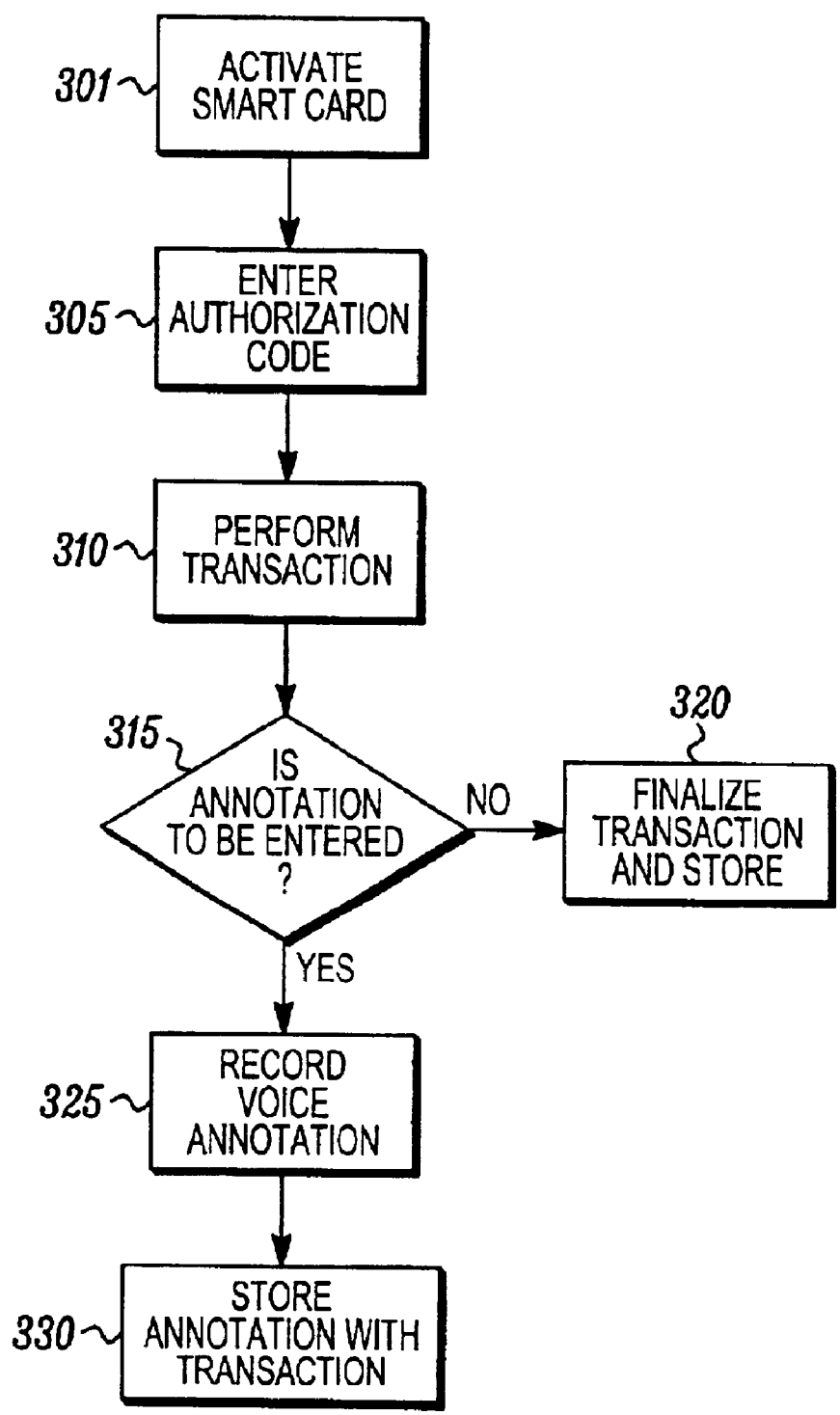
FIG. 3 shows a flowchart of a smart card annotation process of the present invention.

FIG. 3 illustrates a flowchart of the voice annotation process of the present invention. The process starts when the smart card is activated (step 301). The activation may require depressing a power button if one is required. If the smart card is always in a sleep mode until used, the activation may require the insertion of the card into a card reader, either by a merchant or the consumer. When the card is inserted into the card reader, the contacts on the card are coupled to the card reader's contacts. A signal from the card reader then wakes up the smart card to prepare it for the impending transaction.

The consumer must then enter the authorization code (step 305). The authorization code may be entered on a keypad coupled to the card reader. In another embodiment, if the smart card is comprised of a membrane keypad, the consumer can enter the code directly on the smart card's keypad.

In yet another embodiment, the authorization code is entered using the consumer's voice. This may require that the consumer has entered the authorization code by voice prior to the initial transaction. The digitized representation of the consumer's voice is then stored in the smart card for later comparison with the authorization code entered during the transaction.

The transaction is next performed with the smart card (step 310). The transaction may be comprised of the consumer purchasing an item from a merchant in person.

In another embodiment, if the consumer has a card reader coupled to a modem, such as through a computer, the consumer may perform the transaction over the Internet or other computer network. In this embodiment, the merchant's computer accesses the smart card through the Internet in order to record the transaction and deduct the amount from the consumer's account.

After the transaction, the consumer has the option of recording an annotation with the transaction (step 315). In one embodiment, the smart card prompts the consumer with a tone or other indication that provides an opportunity to record the annotation.

If the consumer decides not to record an annotation, the transaction is finalized and stored in memory (step 320). The finalization may include deducting the transaction amount from a balance stored in the smart card's memory. If the smart card does not have a balance stored in memory, the particulars of the transaction (e.g., merchant, price, date) are stored without an annotation.

If the consumer decides to provide an annotation for the transaction (step 315), the voice recorder function of the smart card is activated and records the annotation (step 325). The recorder may be activated by the depression of one or more of the membrane switches on the card's surface.

As illustrated in the embodiment of FIG. 1, the consumer's voice is sampled by the ADC/controller and stored in the memory of the smart card along with the transaction (step 330). The location in memory that the digitized voice signal (i.e., annotation) is stored is not important to the operation of the present invention. The digitized voice signal may be stored prior to the transaction, subsequent to the transaction, or in a separate annotation location with a pointer to the linked transaction.

The digitized voice signal can be stored in various formats. For example, the signal may be stored in a "wav" compatible format that is playable on a computer running the WINDOWS operating system. In one embodiment, the digitized voice signal is compressed with a compression routine before it is stored. This allows the consumer to store a greater quantity of annotations than non-compressed annotations would allow.

Figure 4:
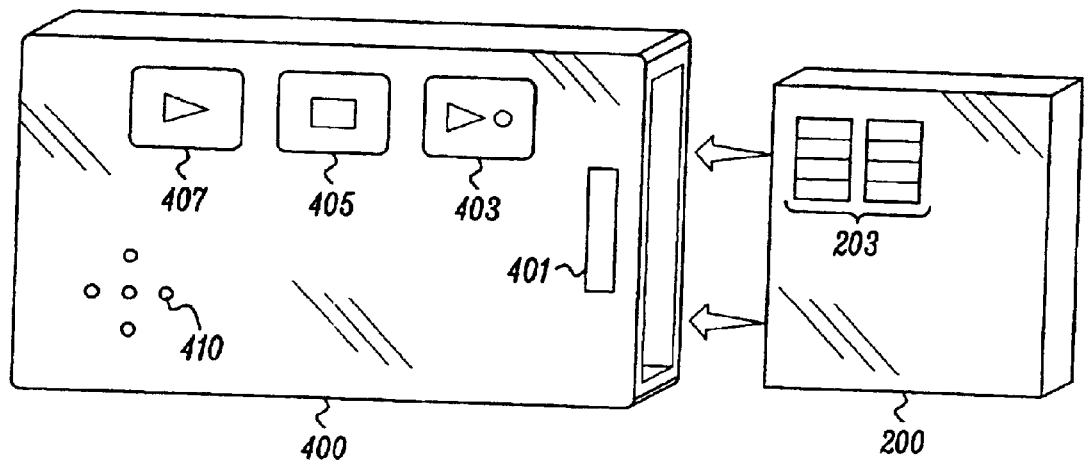
FIG. 4 shows an alternate embodiment of a smart card of the present invention.

FIG. 4 illustrates an alternate embodiment of the smart card of the present invention. The embodiment of FIG. 4 is a smart card (200) that is inserted into a sleeve (400) in order to use the voice annotation process of the present invention.

When the smart card (200) is inserted into the sleeve (400), the contacts (203) on the smart card are mechanically coupled to contacts (not shown) within the sleeve (400). This provides a path for electrical signals to be communicated between the sleeve (400) and the card (200).

Once inserted, the consumer can then access the smart card's memory through controls on the sleeve. In one embodiment, the sleeve has buttons or switches to access the various functions of the card (200). A play switch (407) can play back information stored in the smart card's memory. A stop switch (405) stops playback or recording. A record switch (403) can be depressed to record the consumer's voice through the microphone (401).

A touchscreen display may be substituted for the switches of the embodiment of FIG. 4. A touchscreen display would provide more functionality to the sleeve since different functions and menus may be incorporated than just a certain quantity of fixed function switches. For example, the touchscreen display could display transactional data as well as different switch functions.

With the addition of a speaker (410), the consumer can insert the smart card and play back the voice annotations while viewing the associated transactional data. This embodiment would also require either the touchscreen or a separate display for the data.

This embodiment may also provide the power source in the sleeve (400) so that the smart card (200) only requires the circuitry, thus reducing the weight and thickness of the card. The power source may be a battery, a solar power source, or a combination of the two.

In one embodiment, the switches and microphone of FIG. 4 are coupled to the sleeve's internal contacts so that the signals are conducted directly to the smart card and its controller. In another embodiment, a controller is incorporated into the sleeve and the switches and microphone are coupled to the sleeve's controller. The sleeve's controller digitizes the analog voice signal and transfers the digital voice signal, along with any control signals from the switches, to the smart card's controller.

Figure 5:
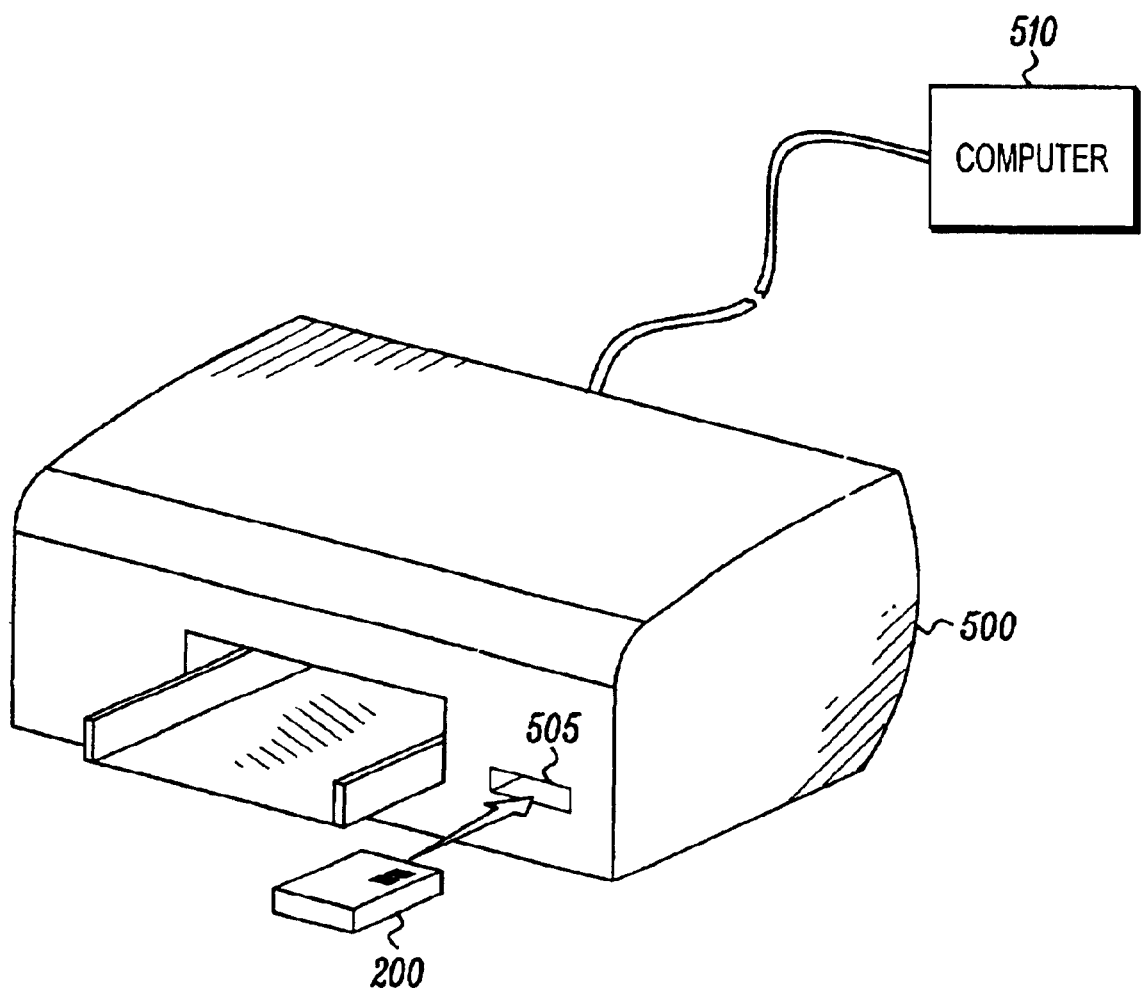
FIG. 5 shows a smart card system of the present invention.

FIG. 5 illustrates a typical smart card system of the present invention. This system is comprised of the smart card (200) that can be inserted into a printer (500) that has a card reader (505). In one embodiment, the card reader (505) is integral with the printer (500). In another embodiment, the card reader (505) is separate from and coupled to the printer (500) through a cable, infrared, or RF link.

The consumer can use the system of the present invention to play and/or print the annotations stored in the smart card (200). If the printer (500) is comprised of a microprocessor that can run a voice transcribing process, the printer (500) is able to read the digitized voice signals out of the card (200) and transcribe the signals into text that can be printed along with the transaction to which the annotation belongs. One example of a typical voice transcribing process is DRAGON NATURALLY SPEAKING.

If the printer (500) and card reader (505) are coupled to a computer (510), the computer (510) can be used to run the voice transcription process to transform the annotations to text. The computer (510) can then store the text, along with the transactional data, in a file on the computer (510), display the text and transactional data on a monitor, or send the text and/or transactional data to the printer for printing. In another embodiment, the computer (510) can transform the digitized voice signal to an analog signal and play the signal over a speaker.

Figure 7:
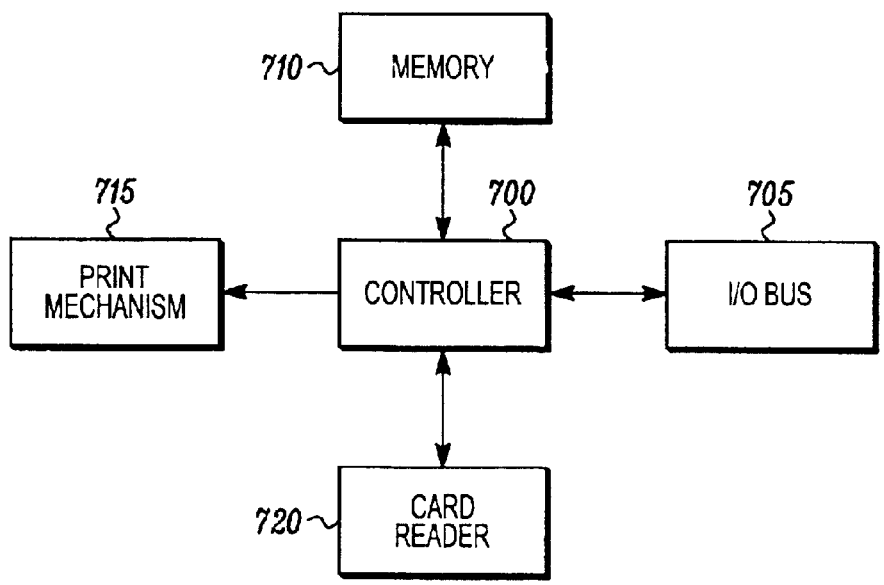
FIG. 7 shows a block diagram of a printer that incorporates a smart card of the present invention.

FIG. 7 illustrates a block diagram of a printer of the present invention. The printer is comprised of a controller or processor (700) that controls the operation of the printer. The controller (700) communicates with a computer or other such device through an I/O bus (705). This bus structure may be a USB, a parallel bus, a serial bus, or any other type of bus structure. The printer and a computer connected through the bus structure form a printing system.

Memory (710), such as RAM and/or ROM, is used to temporarily store information that is to be printed or that is retrieved from the smart card. This memory (710) includes the ROM that stores the instructions used by the controller (700) as well as the RAM in which print jobs are stored while being printed.

A print mechanism (715), such as an inkjet pen or laser print mechanism, is coupled to the controller (700). The print mechanism is responsible for printing the ink or toner on print media in response to instructions from the controller (700).

A card reader (720) is coupled to the controller. The smart card is inserted into the card reader in order to mate the contacts on the smart card with contacts in the reader. This enables communication between the controller of the printer or computer and the smart card.

While the block diagram of FIG. 7 shows the card reader (720) as part of the printer, this is illustrative of only one embodiment of the present invention. The card reader (720) may be an external device that is coupled to the printer through a bus structure. The card reader (720) can also be coupled to or be part of a computer that communicates the smart card information to the printer over the I/O bus (705).

Figure 6:
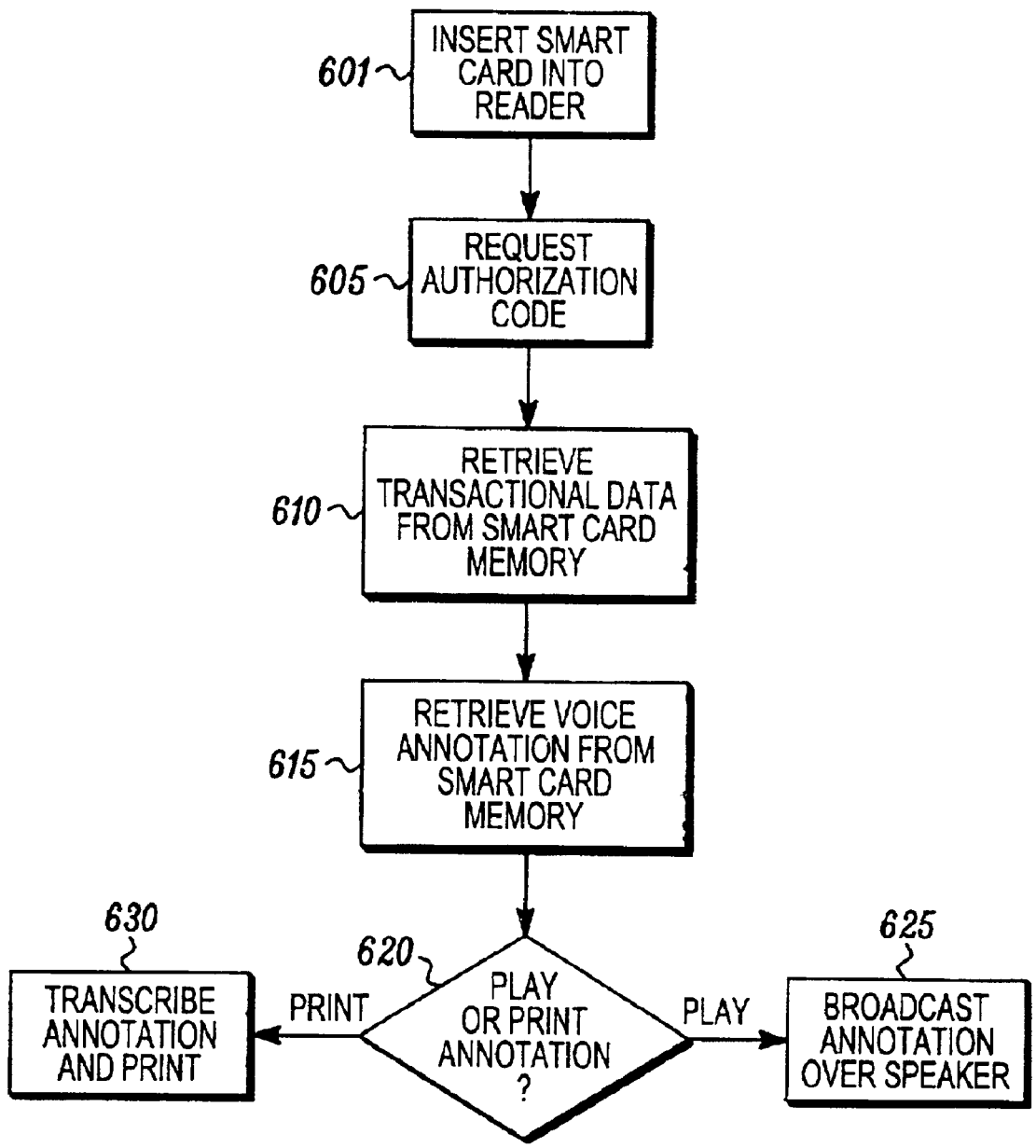
FIG. 6 shows a flowchart for a process for retrieving transaction data and voice annotations from a smart card.

FIG. 6 illustrates a flowchart of a smart card data retrieval process. The process begins with the insertion of the smart card into a card reader (step 601), such as is illustrated in the system of FIG. 5. The authorization code is then requested (step 605). The consumer can then enter the code through the computer's keyboard or by speaking the code. In an alternate embodiment, this authorization step is not required.

The printer or computer then retrieves the transactional data (step 610) along with the respective voice annotations (step 615). If the consumer wishes to just listen to the annotations (step 620), he enters his desire through the keyboard or other means and the annotation is converted from the digital form to an analog form that is played over a speaker or headphone (step 625).

If the consumer desires to have the voice annotations printed out along with the respective transactional data (step 620), he enters his desire. The voice annotations are then transcribed with a transcription program and printed along with the respective transactional data (step 630).

In an alternate embodiment, the computer, printer, or sleeve of FIG. 4 can use a text to speech process to broadcast the transactional data. This embodiment enables the consumer to play back the entire transaction including both data and voice annotations without the use of a monitor or printer.

The voice recording capabilities of the smart card of the present invention are not limited to the storage of annotations for financial transactions. For example, a consumer can use the voice recording functions to record memos, reminders, or any other event that requires recording. If the voice signal is stored in a format compatible with voice transcription, the smart card can be inserted into a card reader coupled to a computer running a transcription program (e.g., NATURALLY SPEAKING) in order to display, print, and/or store the resulting text.

While the preferred embodiment uses the smart card of the present invention as a financial transaction card, other embodiments use the smart card for other types of transactions. For example, the smart card may be a library card, a lunch card for cafeterias, an identification card (e.g., drivers license), or any other type of card that would benefit from both added intelligence and voice annotation.

In summary, the smart card of the present invention provides a consumer with the ability to store voice annotations along with a transaction. The consumer's voice is picked up by a microphone in the smart card, digitized, and stored along with the transactional data so that the consumer can record information about the transaction for later use.

I claim:

1. A smart card having a capability to store a voice annotation with a transaction, the smart card comprising:
    a microphone that produces a voice annotation signal in response to transaction data generated from the transaction;
    a plurality of switches that control operation of the microphone;
    memory that stores the voice annotation signal linked to its respective transaction data;

a controller, coupled to the microphone and the memory, that controls smart card operation including user authorization, storage of the voice annotation signal, and storage of the respective transaction data; and an input/output connector, coupled to the controller, that provides the controller with the transaction data.

2. The smart card of claim 1 and further including an analog to digital converter, coupled between the microphone and the controller, that converts the voice annotation signal to a digital voice annotation signal.

3. The smart card of claim 1 wherein the controller comprises an analog to digital conversion process that converts the voice annotation signal to a digital voice annotation signal.

4. The smart card of claim 1 wherein the plurality of switches are membrane switches.

5. The smart card of claim 1 wherein the plurality of switches are formed on a touchscreen display that is coupled to the controller.

6. The smart card of claim 1 wherein smart card operations additionally comprises user authorization.

7. A method for entering a voice annotation into a smart card having memory for storing a first transaction and its respective voice annotation, the smart card further comprising an I/O connector and a microphone, the first transaction comprising transactional data, the method comprising the steps of:

receiving a user authorization code;

receiving the first transactional data through the I/O connector;

recording, through the microphone, the respective voice annotation related to the first transactional data using a plurality of card switches that control operation of the microphone; and storing the first transactional data and its respective voice annotation in the memory.

8. The method of claim 7 and further including the steps of:

prompting for the voice annotation that describes the first transactional data; and if the voice annotation is not entered, storing the first transactional data in the memory.

9. The method of claim 7 wherein the first transactional data comprises a monetary value and a transaction date.

10. The method of claim 9 wherein the step of storing includes deducting the monetary value from an account balance stored in the memory.

11. The method of claim 7 wherein the step of receiving a user authorization code comprises receiving a voice authorization.

12. The method of claim 11 and further comprising the step of comparing the voice authorization code to an authorization code stored in the memory.

* * * * *